United States Patent
Oblizajek et al.

(10) Patent No.: US 8,571,759 B2
(45) Date of Patent: Oct. 29, 2013

(54) ELECTRIC POWER STEERING COMPENSATION FOR VEHICLES

(75) Inventors: Kenneth L. Oblizajek, Troy, MI (US); John D. Sopoci, Commerce Township, MI (US); Stephen R. Pastor, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 13/190,367

(22) Filed: Jul. 25, 2011

(65) Prior Publication Data

US 2013/0030654 A1   Jan. 31, 2013

(51) Int. Cl.
- *A01B 69/00* (2006.01)
- *B62D 6/00* (2006.01)
- *B62D 5/04* (2006.01)

(52) U.S. Cl.
USPC .............................. 701/42; 701/41; 180/446

(58) Field of Classification Search
USPC ...................... 701/42, 41; 180/446
See application file for complete search history.

(56) References Cited

U.S. PATENT DOCUMENTS

| | | | |
|---|---|---|---|
| 6,122,579 A * | 9/2000 | Collier-Hallman et al. | 701/41 |
| 6,137,886 A * | 10/2000 | Shoureshi | 381/71.2 |
| 6,625,530 B1 * | 9/2003 | Bolourchi | 701/42 |
| 7,222,008 B2 * | 5/2007 | Takahashi et al. | 701/41 |
| 7,363,135 B2 * | 4/2008 | Lin et al. | 701/42 |
| 2006/0180369 A1 * | 8/2006 | Brosig et al. | 180/190 |
| 2007/0250234 A1 * | 10/2007 | Ito et al. | 701/41 |
| 2009/0187312 A1 * | 7/2009 | Nozawa et al. | 701/42 |

FOREIGN PATENT DOCUMENTS

| | | |
|---|---|---|
| DE | 102009020826 A1 | 1/2010 |
| DE | 102011086295 A1 | 6/2012 |
| EP | 1556269 B1 | 6/2008 |
| EP | 1975040 A1 | 10/2008 |

OTHER PUBLICATIONS

German Patent and Trade Mark Office, Office Action in German Patent Application No. 10 2012 211 700.8, mailed Jul. 25, 2013.

* cited by examiner

*Primary Examiner* — Thomas Black
*Assistant Examiner* — Tyler Paige
(74) *Attorney, Agent, or Firm* — Ingrassia Fisher & Lorenz, P.C.

(57) ABSTRACT

Methods and systems are provided for controlling steering in a vehicle having an electric power steering system (EPS) with a steering wheel, the EPS configured to attenuate smooth road shake (SRS) for the vehicle. A first relationship is determined between a torque of the steering wheel and motions of the steering wheel while free of SRS excitation. A second relationship is determined between the torque and the motions with SRS excitation. A mapping is generated based on the first relationship and the second relationship via a processor for use in adjusting steering control.

20 Claims, 3 Drawing Sheets

ELECTRIC POWER STEERING COMPENSATION FOR VEHICLES

TECHNICAL FIELD

The present disclosure generally relates to the field of vehicles and, more specifically, to methods and systems for controlling steering in vehicles having electric power steering systems.

BACKGROUND

Many vehicles today have electric power steering systems. Electric power steering (EPS) systems typically use an electric motor to provide a steering assist to a driver of the vehicle, thereby reducing effort by the driver in steering the vehicle.

Smooth road shake (SRS) is one of the vibrations leading to customers complaints. SRS is caused by internal periodic excitation such as tire/wheel imbalance, tire irregularities, brake rotor imbalance and lack of precision piloting of the rotating members. SRS typically occurs over a band of frequencies extending from 8 to 22 Hz depending on vehicle speed.

In certain vehicles equipped with EPS it is possible to actively attenuate relatively narrowband torsional vibrations that are typical of SRS. When these features are implemented without any additional controls for other lower frequency bands, they also can produce unwanted effects at these lower frequencies, influencing the perception of the steering performance of the vehicle. Even the presence of the mechanical torsional vibrations originating in the periodic excitation by the corners at lower orders of tire rotation (SRS) without any intervention by the EPS motor can result in a degradation in the perception of the steering response. Mechanical vibrations originating in the periodic corner road wheel excitation and the active vibratory actions of the EPS motor can both affect the stiction and friction responses of the steering system thereby producing the perceptions of steering feel degradation. Although not influencing the operation of the vehicle, these perception nuances can be large enough to convey a degree of dissatisfaction with the feel of the steering system as the steering wheel is rotated during mild steering maneuvers.

Accordingly, it is desirable to provide methods for improved steering perception in vehicles, for example that provide an improved feel for the steering system during vibratory conditions as with SRS attenuation by an EPS. It is also desirable to provide program products and systems for improved steering perception in vehicles, for example that provide an improved feel for the steering system during vibratory conditions as with SRS attenuation by an EPS. Furthermore, other desirable features and characteristics of the present disclosure will be apparent from the subsequent detailed description and the appended claims, taken in conjunction with the accompanying drawings and the foregoing technical field and background.

BRIEF SUMMARY

In accordance with an exemplary embodiment, a method is provided of controlling steering in a vehicle having an electric power steering system (EPS) having a steering wheel, the EPS configured to attenuate smooth road shake (SRS) for the vehicle. The method comprises the steps of determining a first relationship between a torque of the steering wheel and the motions of the steering wheel for the first condition, free of SRS excitation, determining a second relationship between the torque and the motions with SRS excitation present for the second condition, and generating a mapping based on the first relationship and the second relationship via a processor for use in adjusting steering control.

In accordance with another exemplary embodiment, a program product is provided for controlling steering in a vehicle having an electric power steering system (EPS) having a steering wheel, and an EPS configured to attenuate smooth road shake (SRS) for the vehicle. The program product comprises a program and a non-transitory computer-readable storage medium. The program is configured to determine a first relationship between a torque of the steering wheel and the motions of the steering wheel for the first condition, free of SRS excitation, determine a second relationship between the torque and the motions for the second condition with SRS excitation, and generate a mapping based on the first relationship and the second relationship for use in adjusting steering control.

In accordance with a further exemplary embodiment, a system is provided for controlling steering in a vehicle having an electric power steering system (EPS) having a steering wheel, the EPS configured to attenuate smooth road shake (SRS) for the vehicle. The system comprises an actuator and a processor. The actuator is configured to dither the steering wheel. The processor is configured to determine a first relationship between a torque of the steering wheel and the motions of the steering wheel for a first condition, free of SRS excitation, determine a second relationship between the torque and the motions for a second condition, with SRS excitation, and generate a mapping based on the first relationship and the second relationship for use in adjusting steering control.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses of the disclosure. Furthermore, there is no intention to be bound by any expressed or implied theory presented in the preceding technical field, background, brief summary or the following detailed description.

Figure 1:
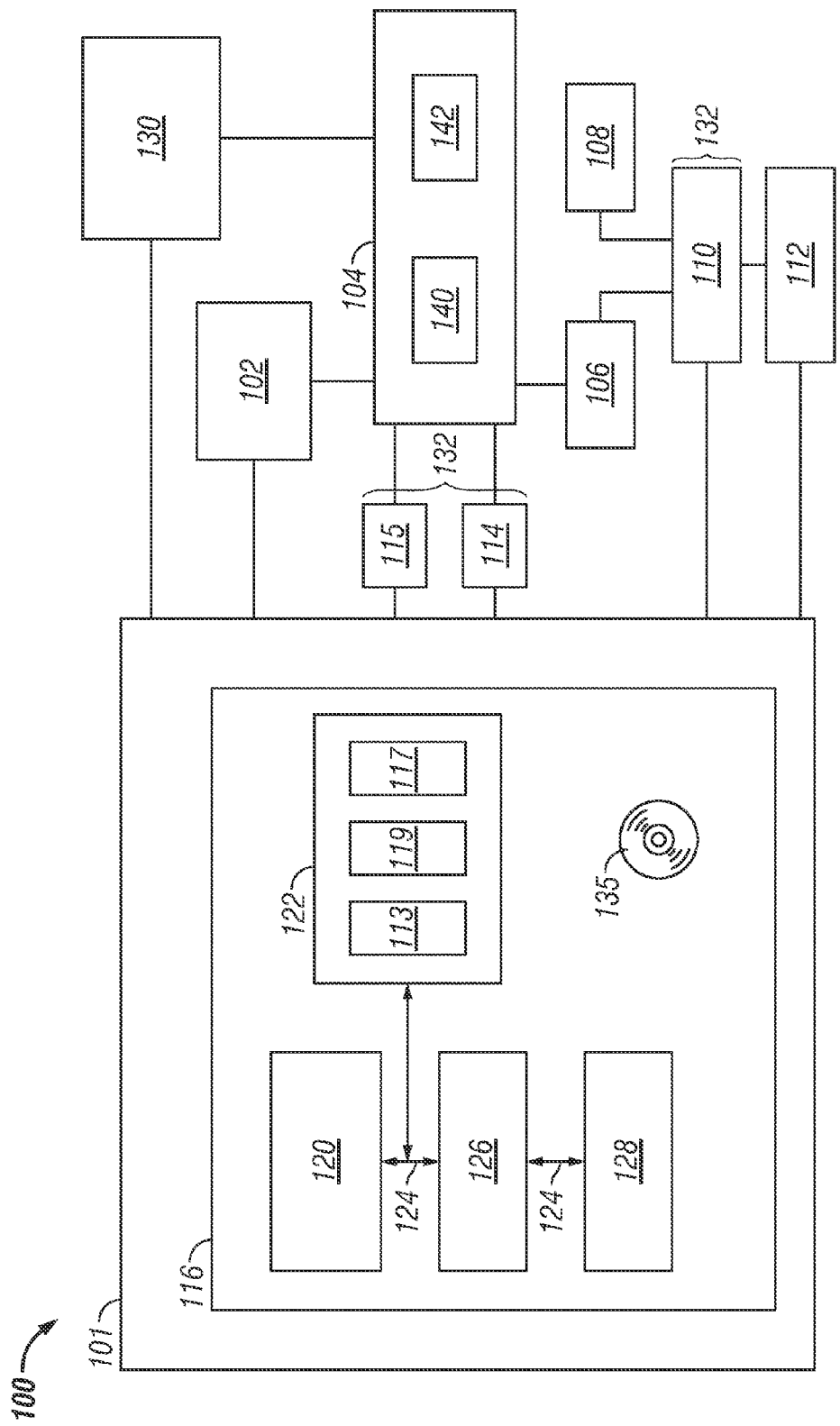
FIG. 1 is a functional block diagram of a system for controlling steering in a vehicle, in accordance with an exemplary embodiment.

FIG. 1 is a functional block diagram showing a system 100 for controlling steering in a vehicle. The vehicle includes a motor 102, a steering system 104, and a plurality of road wheels 106 and 108. In certain embodiments, the vehicle comprises an automobile such as a sedan, a truck, a van, a sport utility, a cross-over vehicle, or another type of automobile. However, the system 100 can be used in connection with any number of types of vehicles.

The steering system 104 includes a steering column 140 and a steering wheel 142. In various embodiments, the steering system 104 further includes various other features (not depicted in FIG. 1), such as a steering gear, intermediate connecting shafts between the column and the gear, connection joints, either flexible or rigid, allowing desired articulation angles between the intermediate connecting shafts, and tie-rods. The steering gear, in turn, comprises a rack, input shaft, and internal gearing.

Specifically, the motor 102 is coupled to the steering system 104, and provides torque or force to a rotatable or translational member of the steering system 104. The motor 102 can be coupled to the rotatable shaft of the steering column or to the rack of the steering gear. In the case of a rotary motor, the motor 102 is typically connected through a geared or belt-driven configuration enabling a favorable ratio of motor shaft rotation to either column shaft rotation or rack linear movement. The steering system 104 in turn influences the steerable road wheels 106 during steering based upon the assist torque received from the motor 102 along with any torque received from a driver of the vehicle.

The system 100 includes an electric power steering (EPS) controller 101 that controls steering for the vehicle. The controller 101 is connected to the motor 102, the steering system 104, and one or more of the road wheels 106 indirectly coupled thereto. The controller 101 may further communicate with or receive information from one or more other vehicle modules 112 (such as an anti-lock braking system, by way of example), as appropriate. The controller 101 attenuates smooth road shake (SRS) in the vehicle by employing control algorithms that typically feature frequency band rejection by means of superimposed dynamic motor drive torques opposing the torsional vibrations during conditions in which SRS is present or likely to be present (for example, when the vehicle velocity is proximate to predetermined speeds). The controller 101 further influences steering perception in a manner that provides for improved feel of the steering wheel 142 for the driver in situations in which smooth road shake (SRS) is being attenuated, preferably by controlling torque for the motor 102.

The controller 101 further includes or is coupled to one or more actuators 130, sensors 132 and/or other vehicle components, such as those depicted in FIG. 1. The controller 101 directs operation of the actuator 130 to modify the steering effort in the steering wheel 142 during various conditions in which smooth road shake is likely to be experienced.

The torque sensor 114 (or other sensor for obtaining the torque signal) is coupled to the steering system 104. The torque sensor 114 measures a torque of the steering wheel 142 both when the steering wheel 142 is being dithered and when the steering wheel 142 is not being dithered and provides signals, or information representative thereof, to the controller 101 for processing. Preferably, the torque sensor 114 generates an electronic torque signal proportional to the static and dynamic mechanical torque in one of the shafts connecting the steering wheel to the steering gear and provides the electronic torque signal to the controller 101. The torque sensor 114 is preferably disposed within the steering system 104.

The steer angle sensor 115 measures a steering angle of the steering wheel 142 both when the steering wheel 142 is being dithered and when the steering wheel 142 is not being dithered and provides signals or information representative thereof to the controller 101 for processing. Preferably, the steer angle sensor 115 generates an electronic steering angle signal representing a steering angle of the steering wheel 142 and provides the electronic steering signal to the controller 101. The steer angle sensor 115 is disposed within the steering system 104, preferably on the steering column 140.

The wheel speed sensors 110 measure speeds of the wheels 106, 108 and provide signals or information representative thereof to the controller 101 for processing. The speed sensor(s) 110 enable determination of vehicle speed. In certain embodiments, the wheel speed sensors 110 are coupled to one or more of the plurality of road wheels 106 and 108, and can be part of the controller 101. However, in various other embodiments, different speed sensors 110 and/or devices may be used (e.g., a driveline rotary shaft speed sensor, and/or one or more other different types of sensors), which may belong to the controller 101 or alternatively another module 112 of the vehicle, such as an ABS (anti-lock braking system) module.

The controller 101 (specifically, the processor 120 thereof described below) processes the signals and/or other information from each of the sensors 132 in order to determine relationships between the steering angle and steering torque for the steering wheel 142 under various dithering conditions and speeds of the vehicle. In certain embodiments, the relationships may be objective relationships as determined via calculations and measurements of the controller 101. In certain other embodiments, the relationships may be subjective relationships that are determined based on a driver's engagement of the steering wheel 142 and/or other operation of the vehicle. The controller 101 (specifically, the processor 120 thereof described below) then uses these relationships to generate difference values 119 characterizing these relationships and to generate look-up tables 117 pertaining thereto. The difference values 119 and look-up tables 117 may be stored in memory (specifically, the memory 122 described below) and subsequently used by the controller (specifically, the processor 120 thereof described below) in controlling steering in a manner that makes the steering wheel 142 more comfortable for the driver when SRS mitigation is required, preferably by controlling torque for the motor 102.

Also as depicted in FIG. 1, the controller 101 preferably comprises a computer system 116. The computer system 116 includes a processor 120, a memory 122, a computer bus 124, an interface 126, and a storage device 128. The processor 120 performs the computation and control functions of the computer system 116 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 113 preferably stored within the memory 122 and, as such, controls the general operation of the computer system 116, and the controller 101 in general.

As referenced above, the memory 122 stores a program or programs 113 that execute one or more embodiments of processes such as the process 200 described below in connection with FIG. 2 and/or various steps thereof and/or other processes, such as those described elsewhere herein. In the depicted embodiment, the memory 122 also stores a plurality of difference value parameters and related information 119, and one or more look-up tables 117 for use in processing the current measure of the torque signal and steering angle or information pertaining thereto, and the wheel speed(s) or information pertaining thereto for use in controlling and adjusting the motor drive torque.

The memory 122 can be any type of suitable memory. This would include the various types of dynamic random access memory (DRAM) such as SDRAM (synchronous dynamic access memory), the various types of static RAM (SRAM), and the various types of non-volatile memory (PROM (programmable read only memory), EPROM (erasable programmable read only memory), and flash. In certain examples, the memory 122 is located on and/or co-located on the same computer chip as the processor 120.

The computer bus 124 serves to transmit programs, data, status and other information or signals between the various components of the computer system 116 and the signals from other modules. The computer bus 124 can be any suitable physical or logical means of connecting computer systems and components. This includes, but is not limited to, direct hard-wired connections, fiber optics, infrared and wireless bus technologies, a LAN (local area network) bus, a CAN (controller area network) bus and/or one or more other technologies.

The interface 126 allows communication to the computer system 116, for example from a vehicle occupant, a system operator, and/or another computer system, and can be implemented using any suitable method and apparatus. In certain embodiments, the interface 126 at least facilitates providing the current measure of the torque signal or information pertaining thereto from the torque sensor 114, and/or the wheel speed or information pertaining thereto from the speed sensor(s) 110. The interface 126 can include one or more network interfaces to communicate within or to other systems or components, one or more terminal interfaces to communicate with technicians, and one or more storage interfaces to connect to storage apparatus such as the storage device 128.

The storage device 128 can be any suitable type of storage apparatus, including direct access storage devices such as hard disk drives, flash systems, floppy disk drives and optical disk drives. In one exemplary embodiment, the storage device 128 comprises a program product from which memory 122 can receive a program 113 that executes one or more embodiments of one or more processes of the present disclosure, such as the steps of the process 200 described further below in connection with FIG. 2. In another exemplary embodiment, the program product may be directly stored in and/or otherwise accessed by the memory 122 and/or a disk (e.g. disk 135), such as that referenced below.

It will be appreciated that while this exemplary embodiment is described in the context of a fully functioning computer system, those skilled in the art will recognize that the mechanisms of the present disclosure are capable of being distributed as a program product with one or more types of non-transitory computer-readable storage media and/or signal bearing media used to store the program and the instructions thereof and carry out the distribution thereof, such as a non-transitory computer readable medium bearing the program and containing computer instructions stored therein for causing a computer processor (such as the processor 120) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 116 may also otherwise differ from the embodiment depicted in FIG. 1, for example in that the computer system 116 may be coupled to or may otherwise utilize one or more remote computer systems and/or other control systems.

Figure 2:
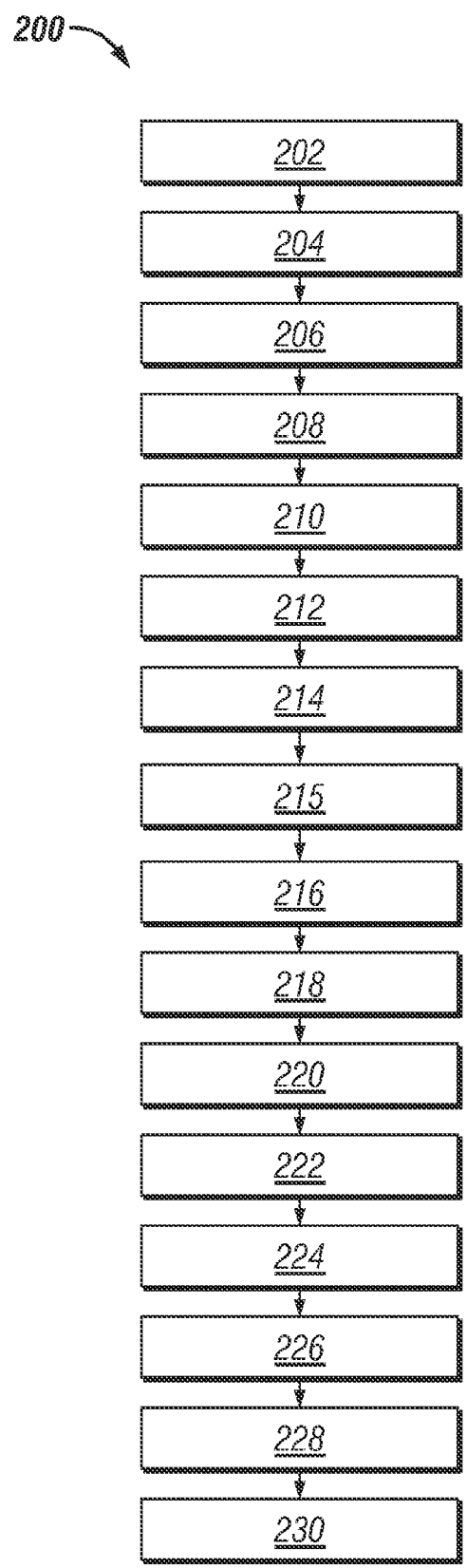
FIG. 2 is a flowchart of a process for controlling steering in a vehicle, and that can be used in connection with the system of FIG. 1, in accordance with an exemplary embodiment.

FIG. 2 is a flowchart of a process 200 for tuning steering in a vehicle, in accordance with an exemplary embodiment. Specifically, the process 200 improves the feel of the steering system of a vehicle while undergoing torsional vibration during periodic excitation of the suspension corners. Such a condition may exist, for example, while vibratory conditions are present during active SRS attenuation. In a preferred embodiment, the process 200 can be implemented in connection with the system 100 of FIG. 1 and/or through program products that can be utilized in connection therewith. However, it will be appreciated that in various embodiments the process 200 may also be utilized in connection with any number of different types of systems and/or other devices.

As depicted in FIG. 2, the process 200 includes the steps of obtaining a vehicle without any perceptible levels of tire-periodic torsional steering wheel vibration, (step 202). This implies that the vehicle does not require any active SRS attenuation. The steering response is then optimized with respect to performance characteristics such as friction, stiction, and elasticity (step 204). The steering response optimization of step 204 is preferably performed subjectively by a technician. In step 204, a decision is made to either enable or disable the introduction of dither. As referenced herein, dither represents vibratory torque produced by the motor at one or multiple frequencies to render the mechanical system more linear, overcoming such actions as stiction and friction. Dither may be employed in control systems that are burdened with non-linear effects of irregular motion, stiction and friction (insert reference). Dither can be used in the EPS to manage these effects, enabling improved performance and tunability while operating during the absence of periodic vibrations. Dither can likewise be used to improve the transitional performance between times absent of influential periodic vibratory content and those involving either larger non-intervened mechanical vibration or those during active attenuation by the EPS. A preferred frequency band of dither exists within approximately 24 Hz to 40 Hz. The dither levels are also preferably non-detectable to the occupants as direct vibratory content, but sufficient in amplitude to produce perceptible differences in the steering performance at lower frequencies, for example, 0-6 Hz. Adjustments of the dither will vary from vehicle model to vehicle model and are accomplished either subjectively or with the aid of instrumentation by attention to the relationship between measured steering torque and steering motions. If employed, it is preferred that the dither will vary depending on the presence of the periodic SRS, typically diminishing with increasing periodic vibration. This follows as a consequence of the general tendencies of these systems, exhibiting reduced hysteresis with presence of periodic and dithered content. This, in turn, follows from the objective for desired performance, for instance, to achieve identical or similar perception of steering performance during all conditions of periodic excitation. This may include the conditions completely lacking torsional periodic vibratory content as well as any expected amount of periodic excitation that may occur during normal operation of the vehicle.

Additional steering response characteristics are then determined (step 206). Specifically, a first relationship is determined between the steering motions and steering torque of the steering wheel in order to ascertain characteristics as to a desired performance for the steering response under various levels of vehicle speed, and optionally, during dither under the vibratory-free conditions of steps 202 and 204. These steering response characteristics may be determined using the objective method as described in the FIG. 3 flowchart, or alternatively through a subjective evaluation performed by a skilled driver that is then interpreted and results in a change to the properties of the control device or system.

Figure 3:
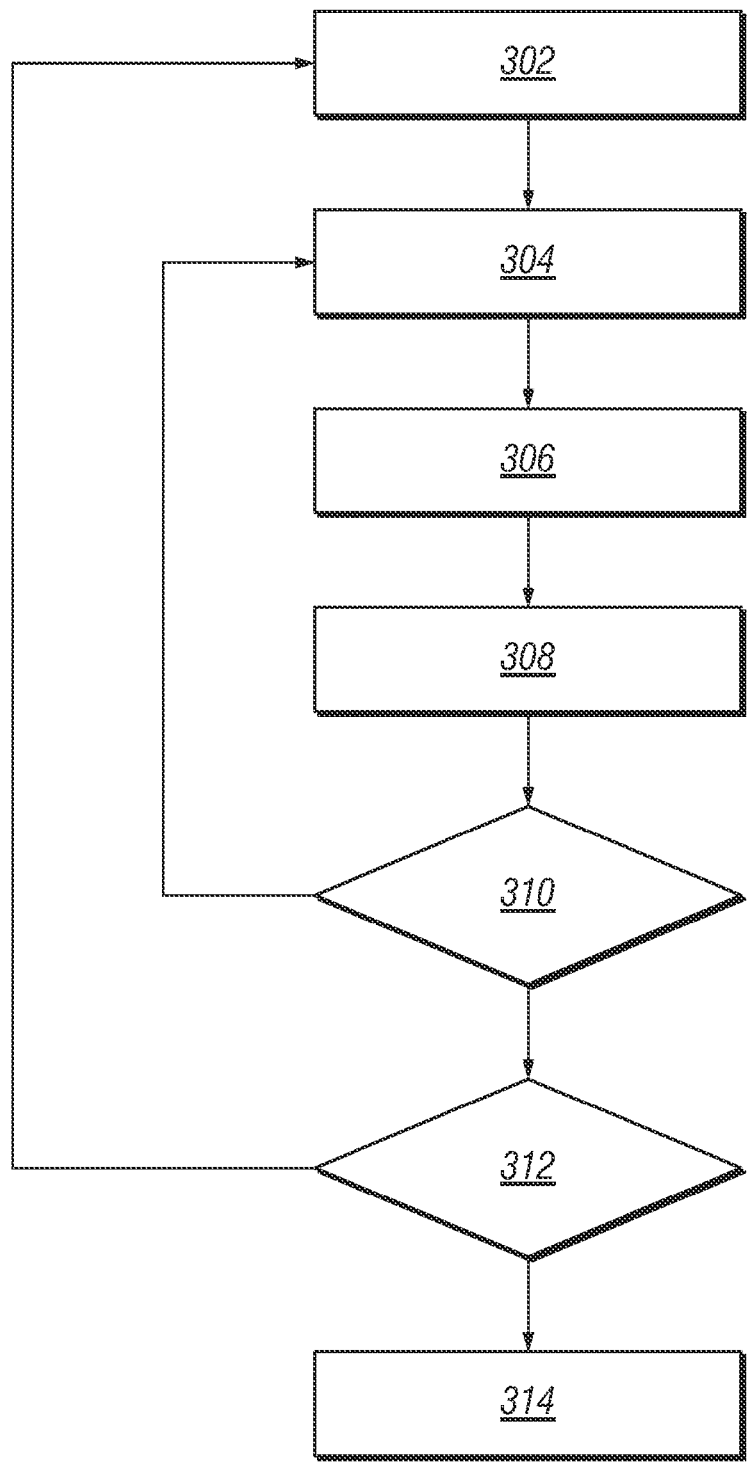
FIG. 3 is a flowchart of a sub-process of the process of FIG. 2, namely the sub-process of determining steering wheel characteristics under specific conditions, in accordance with an exemplary embodiment.

With reference to FIG. 3, a flowchart is provided for a sub-process 300 for determining the relationship between the steering motions and the steering torque of the steering wheel under specific conditions, in accordance with an exemplary embodiment. In a preferred embodiment, the steps of the sub-process 300 are performed during step 206 for the conditions of steps 202 and 204, and are subsequently performed in steps 210 and 220 under various different conditions set forth with respect to those steps, as described further below.

In the depicted embodiment, the vehicle is operated at the selected vehicle speed (step 302). In addition, if desired, the steering system is dithered while the vehicle remains at the first vehicle speed of step 302 (step 304). When process 300 is used for steps 210 and 220, the steering system is also excited with a first level of mechanical road wheel excitation of one or more corners of the vehicle and a first level of dithered electrical excitation of the motor while the active SRS attenuation is enabled and in selected cases, while the SRS attenuation is disabled. It is sometimes desirable to disable active SRS attenuation during extremely low levels of SRS vibration and to thereby achieve other benefits such as reduced power consumption. However, the presence of even non-detectable levels of SRS vibration, ie, vibrations that are below thresholds of human perceptibility, can influence the stiction and friction in the steering system, thereby impacting the perception of the steering response. These conditions can likewise be accommodated with the proposed methods and the EPS controls adjusted accordingly.

The steering motions of the steering wheel are measured (step 306). Specifically, the steering motions of the steering wheel are measured under the specific vehicle speed and conditions of steps 302 and 304. The steering angle is preferably measured by the steer angle sensor 115 of FIG. 1, and signals representative thereof are provided to the processor 120 of FIG. 1 for processing. The velocity of the steering wheel can be obtained from either a separate velocity sensor incorporated in the steering angle sensor or placed elsewhere, or by differentiating the steering wheel angle signal with respect to time.

In addition, the steering torque of the steering wheel is simultaneously measured (step 308). Specifically, the steering torque is measured under the specific vehicle speed and conditions of steps 302 and 304. The steering torque is preferably measured by the torque sensor 114 of FIG. 1, and signals representative thereof are provided to the processor 120 of FIG. 1 for processing.

A determination is then made as to whether any other dithering and road wheel excitation combinations have yet to be performed (step 310). This determination is preferably made by the processor 120 of FIG. 1 to ascertain whether all desired combinations of mechanical road wheel excitation of one or more corners of the vehicle and electrical excitation of the motor have been performed in various iterations of step 304 with respect to the specific vehicle speed of step 302.

If it is determined in step 310 that additional combinations have not yet been performed for the current vehicle speed, the process then returns to step 304 and introduces a different dithering and road wheel excitation combination. Specifically, dithering and road wheel excitation continues in step 304 with a different level of mechanical road wheel excitation of one or more corners or electrical excitation of the motor. Steps 304-310 repeat in this manner in various iterations for the various different combinations of dithering levels and road wheel excitation for mechanical road wheel excitation of one or more corners of the steering system or electrical excitation of the motor, and steering motion values and steering torque values are measured for these conditions in steps 306 and 308, until all of the desired dithering and road wheel excitation combinations are performed for the current vehicle speed of step 302. The different combinations preferably correspond to different conditions that are likely to be experienced while driving the vehicle.

Once a determination is made in an iteration of step 310 that each of the desired combinations has been utilized for the current vehicle speed, the process then returns to step 302 for a different vehicle speed. Specifically, the vehicle speed is changed to a different level in step 302. During steps 304-310, steering motions and steering torque measurements are obtained for the various combinations at this new vehicle speed, until a new vehicle speed is determined in a subsequent iteration of step 312, and so forth. Steps 302-312 repeat in this manner in various iterations for the various different desired vehicle speeds for testing. The different vehicle speed combinations preferably correspond to vehicle speeds resulting in active vibratory conditions that are likely to be experienced while driving the vehicle.

Accordingly, for each combination of vehicle speed, road wheel excitation and dithering levels, steering motion values and steering torque values are measured for these specific conditions in steps 306 and 308, until all of the desired road wheel excitation and dithering combinations are performed for the current vehicle speed of step 302. Once a determination is made in step 312 that all of the desired vehicle speeds have been completed (and previously in step 310 that all of the desired road wheel excitation and dithering combinations have been performed), then a relationship is determined between the steering motions and the steering torque (step 314). Specifically, relationships are determined between the steering motions and the steering torque among the various vehicle speeds, road wheel excitations and dithering combinations of steps 302 and 304. The relationship is preferably determined by the processor 120 of FIG. 1. In one embodiment, the relationship comprises a multi-dimensional look-up table of steering angle, steering velocity, steering torque, vehicle velocity, dithering levels and SRS motor drive torque.

Returning to FIG. 2, a periodic mechanical road wheel excitation is introduced for at least one of the front corners at step 208. Imbalance is a convenient means to accomplish the periodic road wheel excitation. This can be achieved by adding an intentional amount of imbalance at the rim of the wheel of the tire. The selection of a maximum amount of imbalance for consideration is preferentially determined by the level of dynamic corner force expected to be attenuated during active SRS suppression. This maximum amount of imbalance is preferably at the discretion of the practitioner, and the relationship between the resultant dynamic corner forces and the amounts of imbalance arises from accepted inertial considerations, given the radius of the weight placement and the rotational frequency of the tire. These considerations are well known to those skilled in the art. It is also preferable that intermediate levels of mechanical road wheel excitation are likewise introduced in subsequent steps and a relationship established between the various control parameters such as constants, look-up tables, various desired control maps and the amount of SRS and motor excitation. For the case of either proportional or integral closed loop active attenuation, the amount of SRS-attenuating motor drive torque can be used as a reliable input variable for these various control functions. While the active attenuation is disabled, however, the periodic content in the sensing elements within the EPS, such as a torque sensor, is preferably used as an input variable for these control functions. Feed forward configurations, however, preferably include the combination of the periodic feed forward drive signal as well as the periodic content in the sensing elements as input variables.

Steering response characteristics are then determined (step 210) for the periodically excited condition. Specifically, a second relationship is determined between the steering motions and steering torque of the steering wheel in order to ascertain characteristics as to the feel for the steering performance under various vehicle speeds with the road wheel excitation conditions of step 208. Specifically, during step 210, in a preferred embodiment, the steps of the sub-process 300 of FIG. 3 for the various desired speeds and, optionally, dithering conditions for data obtained while the vehicle is in the periodically excited condition of step 208. The steering response characteristics may alternatively be determined through a subjective evaluation performed by a skilled driver.

The relationships from steps 206 and 210 are then compared (step 212). Specifically, difference values are generated in step 212 for comparing the first relationship of step 206 and the second relationship of step 210. Preferably, the difference values include mathematical differences between the steering torque values between the conditions of step 208 as compared with the conditions of step 204 for various levels of steering motions, vehicle speed, and optionally, dithering. The difference values are preferably extracted from the relationships between steering wheel torque, steering wheel angle and steering wheel angular velocity. These relationships, furthermore, are calculated by either accepted systems identification methods (reference) or simplified averaging. In the case of simplified averaging, a preferred method entails two steps of processing with the data obtained during the steering maneuvers (namely, step one and step two, described below). These steering maneuvers can be characterized by approximate sinusoidal variation in steering wheel angle versus time.

Step one of this simplified process forms the average torque acquired during these maneuvers at selected incremental steering wheel angles over multiple cycles of steer. Step two establishes the dependencies of torque on steering wheel velocity by subtracting the expected torque based on the instantaneous steer angle from the relationship established in step one and forms the average of the residual torques at selected steering wheel velocities. Increments of steering wheel angles and steering wheel velocities depend on the resolution of the sensor(s), and preferred increments are approximately 0.1 degrees and 0.1 degrees per second. The imposed sinusoidally varying steering wheel angles preferably vary between +/−15 degrees executed at each of 0.25, 0.5 and 1.0 Hz. Magnitudes of the maximum steer angles (for example, approximately +/−15 degrees) and the frequencies of the steering maneuvers can vary from vehicle model to vehicle model and at the discretion of the practitioner. The difference values quantify the difference in steering effort responsible for the feel of the steering system between the conditions of step 204 and 208. The difference values are preferably generated by the processor 120 of FIG. 1. The processor 120 also preferably generates look-up tables and/or other mappings (step 214) based on the difference values of step 212. After sufficient characterization over multiple conditions of excitation, the blending, interpolating or otherwise populating of the various control parameters is completed in step 215. In the absence of multiple conditions of road wheel excitation, the practitioner could employ linear, non-linear or experience-based variables for populating necessary tables, maps, and related parameters. These related parameters include, but are not limited to, friction compensation and damping compensation functions. In addition, most current-day EPS systems typically exhibit reductions in friction or hysteresis during vibratory conditions. In an attempt to recover the loss in the friction and hysteresis during vibration, friction compensation as a function of the vibratory state demands the addition of motor drive command such that friction is increased during the vibration. This is counter to existing control methodology, wherein friction or hysteretic compensation is designed to reduce friction. Significant gains in the perception of the steering system are possible and can be subjectively optimized with the addition of this control. The gains and polarities of all of these functions and other control parameters may in turn be functions of certain measured quantities provided by the vehicle sensors. These measured quantities may include, but are not limited to, Steering Wheel Angle, Steering Wheel Velocity, Steering Wheel Torque, and Steering Wheel Torsional Vibration Magnitude.

If the steering response characteristics from steps 206 and 210 were determined subjectively, then the look-up tables and other steering parameters developed in step 214, which are later blended in step 215, are also created subjectively and modified incrementally during a series of road tests.

In certain embodiments, the results of step 215, are validated by evaluating the vehicle with the look up tables, maps and constants from 215, as described below in connection with steps 216-222. Many of the decisions that are made for blending, interpolating or otherwise populating the various control parameters, based on the discrete selected conditions of 204 and 208 are preferentially validated with steps 216-222. Specifically, current is provided to the motor and the vehicle is operated, or road tested (step 216) without any significant periodic excitation. Also during the road testing and in subsequent evaluations, periodic road wheel excitation is introduced on at least one of the road wheels (step 218). During step 218, road wheel excitation is introduced to the steering system similar to that described above in connection with step 208.

Steering wheel characteristics are then determined (step 220). Specifically, a new relationship is determined between the steering wheel motions and steering torque of the steering system in order to ascertain characteristics as to the feel for the steering wheel under various levels of steering wheel dithering and vehicle speed under the road test of step 216, and using the road wheel excitation conditions of step 218. Specifically, during step 220 in a preferred embodiment, the steps of the sub-process 300 of FIG. 3 are executed for the various desired vehicle speeds and dithering conditions while the vehicle is in the road test of step 216 and also while using the road wheel excitation conditions of step 218. The steering response characteristics of step 220 are preferably performed by the processor 120 of FIG. 1. The steering response characteristics may alternatively be determined through a subjective evaluation performed by a skilled driver.

A validation is then conducted comparing the relationship of step 220 with that of step 206 (step 222). Specifically, the relationships of steps 206 and 220 are preferably compared objectively and results evaluated subjectively, such as by a technician, to assess variables pertaining to the overall feel of the steering wheel response. Alternatively, the relationships of steps 206 and 220 may be compared subjectively only. The road test is thereby used to validate the control configurations.

Following the validation, the mappings (and/or data related thereto) are stored in memory (step 224). Preferably, the look-up tables and/or other mappings of step 214 are stored as look-up tables 117 in the memory 122 of FIG. 1 by the processor 120. In addition, in a preferred embodiment, the difference values of step 212 are stored as difference values 119 in the memory 122 of FIG. 1 by the processor 120.

Subsequently, when the vehicle is operated by the driver in a non-test setting (for example, after the driver has purchased the vehicle or has left a service center, or the like), the difference values and/or mappings with related control parameters can be used for controlling steering in the vehicle at times when the EPS (preferably, the controller 101 of FIG. 1) undergoes torsional vibratory activity such as while attenuating smooth road shake (SRS) for the vehicle. Specifically, when the vehicle is being driven and the torsional vibratory content is present, a forward speed of the vehicle is determined (step 226). The forward speed is preferably transmitted to the processor 120 of FIG. 1 based on wheel speed values measured by the wheel speed sensors 132 of FIG. 1 and provided to the processor 120 by another control module, such as the EBCM (Electronic Brake Control Module).

The mappings of steps 212 and/or 214 applied to the measurements of the steering motions are then used to drive the EPS motor (step 228). In one embodiment, the processor 120 of FIG. 1 retrieves the look-up tables 117 from the memory 122 of FIG. 1 for use in this determination. In another embodiment, the processor 120 of FIG. 1 retrieves the difference values 119 from the memory 122 of FIG. 1 for use in this determination. In either case, the processor 120 of FIG. 1 consults the look-up tables and/or difference values with the forward vehicle speed and/or one or more other conditions and/or parameter in determining the optimal drive torque for the motor.

The motor drive torque is then adjusted accordingly (step 230). Specifically, the motor drive torque is adjusted to reach the optimal motor drive torque level of step 228. Preferably, during step 230, the drive torque for the motor 102 of FIG. 1 is adjusted in accordance with instructions provided by the processor 120 of FIG. 1. The resulting change in motor drive torque helps to restore a typical feel for the steering response, to compensate for any degradation of the steering feel that may have resulted from the vibratory content.

It will be appreciated that certain steps of the process 200 and/or the sub-process 300 may vary from those depicted in FIGS. 2 and 3 and described herein in certain embodiments. It will similarly be appreciated that certain steps of the process 200 and/or the sub-process 300 may be performed simultaneously or in a different order from those depicted in FIGS. 2 and 3 and described herein.

Accordingly, improved methods, program products, and systems are provided for optimally controlling motor drive torque in a vehicle. The improved methods, program products, and systems allow for smooth road shake to be better controlled based on dynamic inputs represented by the calculated vehicle speed along with the torque frequency and torque magnitude as determined from the torque signal received from the steering system of the vehicle. The improved methods, program products, and systems thus allow for motor drive torque to be increased at vehicle speeds and torque frequencies that are likely to result in smooth road shake conditions, and to thereby minimize the smooth road shake vibrations under these conditions, while also allowing for the motor drive torque to remain unchanged at vehicle speeds and torque frequencies that are unlikely to result in smooth road shake conditions.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, sport utilities, and cross-over vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling steering in a vehicle having an electric power steering system (EPS) having a steering wheel, the EPS configured to attenuate smooth road shake (SRS) for the vehicle, the method comprising the steps of:
    determining a first relationship between a torque of the steering wheel and motions of the steering wheel while free of SRS excitation;
    determining a second relationship between the torque and the motions with SRS excitation through road wheel excitation; and
    generating a mapping based on the first relationship and the second relationship via a processor for use in adjusting steering control.

2. The method of claim 1, wherein the vehicle has a motor, and the step of adjusting the steering control comprises the step of:
    adjusting a drive torque of the motor by the EPS based on the mapping.

3. The method of claim 1, wherein the step of determining the first and second relationships comprises the step of applying vibratory excitation to the steering wheel.

4. The method of claim 3, wherein the vehicle has a motor, and the step of applying vibration to the steering wheel comprises the step of:
    applying at least one of a roadwheel excitation at one or more of a first plurality of excitation levels of SRS excitation and an EPS motor excited vibration at one or more of a second plurality of excitation levels comprising:
        a first plurality of levels of mechanical road wheel excitation of one or more corners of the vehicle; and
        a second plurality of levels of electrical excitation of the motor.

5. The method of claim 4, further comprising the step of:
    generating one or more difference values relating the first relationship and the second relationship for the plurality of different excitation levels and the plurality of different vehicle speeds;
    wherein the step of generating the mapping comprises the step of populating one or more look-up tables using the one or more difference values.

6. The method of claim 5, further comprising the steps of:
    determining a forward speed value of the vehicle; and
    adjusting a drive torque of the motor during SRS attenuation by the EPS based on the forward speed value and the one or more look-up tables.

7. The method of claim 2, wherein the step of adjusting the drive torque further comprises the step of:
    increasing friction for the EPS for control of hysteresis.

8. A program product for controlling steering in a vehicle having an electric power steering system (EPS) having a steering wheel, the EPS configured to attenuate smooth road shake (SRS) for the vehicle, the program product comprising:

a program configured to:
  determine a first relationship between a torque of the steering wheel and motions of the steering wheel while free of SRS excitation;
  determine a second relationship between the torque and the motions with SRS excitation through road wheel excitation; and
  generate a mapping based on the first relationship and the second relationship for use in adjusting steering control; and
a non-transitory, computer-readable storage medium storing the program.

9. The program product of claim 8, wherein the vehicle has EPS controls and a motor, and the program is further configured to adjust a drive torque of the motor based on the mapping and employ active SRS attenuation with the EPS controls and the motor.

10. The program product of claim 8, wherein the vehicle has a motor, and the program is further configured to at least facilitate:
  applying at least one of a roadwheel excitation at one or more of a first plurality of excitation levels of SRS excitation and the program product is further configured to apply an EPS drive torque at one or more of a second plurality of excitation levels comprising:
    a first plurality of levels of mechanical road wheel excitation of one or more corners of the vehicle; and
    a second plurality of levels of electrical excitation of the motor.

11. The program product of claim 10, wherein the program is further configured to:
  generate one or more difference values relating the first relationship and the second relationship for the plurality of different excitation levels and the plurality of different vehicle speeds; and
  populate one or more look-up tables using the one or more difference values.

12. The program product of claim 11, wherein the program is further configured to:
  determine a forward speed value of the vehicle; and
  adjust a drive torque of the motor during SRS attenuation by the EPS based on the forward speed value and the one or more look-up tables.

13. A system for controlling steering in a vehicle having an electric power steering system (EPS) having a steering wheel, the EPS configured to attenuate smooth road shake (SRS) for the vehicle, the system comprising:
  an actuator configured to dither the steering wheel; and
  a processor configured to:
    determine a first relationship between a torque of the steering wheel and the motions of the steering wheel while free of SRS excitation;
    determine a second relationship between the torque and the motions with SRS excitation through road wheel excitation; and
    generate a mapping based on the first relationship and the second relationship for use in adjusting steering control.

14. The system of claim 13, wherein the vehicle includes EPS controls and a motor, and the processor is further configured to adjust a drive torque of the motor and employ active SRS attenuation with the EPS controls and the motor.

15. The system of claim 13, wherein the vehicle has a motor, and the steps of determining a first relationship and a second relationship between the torque and the motions comprise:
  applying at least one of a roadwheel excitation at one or more of a first plurality of excitation levels of SRS excitation and an EPS motor excited vibration at one or more of a second plurality of excitation levels comprising:
    a first plurality of levels of mechanical road wheel excitation of one or more corners of the vehicle; and
    a second plurality of levels of electrical excitation of the motor.

16. The system of claim 15, wherein the processor is further configured to:
  generate one or more difference values relating the first relationship and the second relationship for the plurality of excitation levels and the plurality of vehicle speeds; and
  populate one or more look-up tables using the one or more difference values.

17. The system of claim 16, wherein the processor is further configured to:
  determine a forward speed value of the vehicle; and
  adjust a drive torque of the motor during SRS attenuation by the EPS based on the forward speed value and the one or more look-up tables.

18. The method of claim 1 further comprises the step of:
applying dither to the steering wheel.

19. The method of claim 1, wherein:
  the step of determining the first relationship comprises determining the first relationship between a first steering effort required to maintain a common steering feel for the steering system under a first set of conditions in which SRS excitation is not present;
  the step of determining the second relationship comprises determining the second relationship between a second steering effort required to maintain the common steering feel for the steering system under a set of conditions in which SRS excitation is present; and
  the step of generating the mapping comprises determining a difference between the first steering effort and the second steering effort.

20. The method of claim 18, wherein:
  the step of determining the first relationship comprises determining the first relationship based on a first steering of the steering wheel of the vehicle for each of a plurality of frequencies under 6 Hz for each of a plurality of vehicle speeds under the first set of conditions; and
  the step of determining the second relationship comprises determining the second relationship based on a second steering of the steering wheel for each of the plurality of frequencies for each of the plurality of vehicle speeds under the second set of conditions.

* * * * *